(12) United States Patent
Ichinose et al.

(10) Patent No.: US 7,061,689 B2
(45) Date of Patent: Jun. 13, 2006

(54) LENS BARREL AND PHOTOGRAPHING APPARATUS INCORPORATING THE SAME

(75) Inventors: Harunobu Ichinose, Utsunomiya (JP); Daisuke Fujiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/157,655

(22) Filed: Jun. 21, 2005

(65) Prior Publication Data

US 2005/0286141 A1  Dec. 29, 2005

(30) Foreign Application Priority Data

Jun. 24, 2004 (JP) ............................. 2004-187048

(51) Int. Cl.
*G02B 15/14* (2006.01)
*G02B 7/02* (2006.01)

(52) U.S. Cl. ........................ 359/696; 359/694; 359/823

(58) Field of Classification Search ........ 359/696–698, 359/694, 823, 824; 396/85, 144
See application file for complete search history.

(56) References Cited

U.S. PATENT DOCUMENTS 6,002,531 A * 12/1999 Nakashima et al. ........ 359/700
6,553,185 B1 * 4/2003 Inaba et al. .................... 396/85
6,654,182 B1 * 11/2003 Miyakawa .................. 359/704

FOREIGN PATENT DOCUMENTS

| JP | 5-107538 A | 4/1993 |
| JP | 11-133474 A | 5/1999 |
| JP | 2002-214504 A | 7/2002 |

* cited by examiner

*Primary Examiner*—Ricky Mack
*Assistant Examiner*—M. Hasan
(74) *Attorney, Agent, or Firm*—Canon U.S.A. Inc. IP Division

(57) ABSTRACT

A lens barrel includes a mount member configured to couple the lens barrel to a camera body, the mount member having a coupling surface for coupling with the camera body, a lens holding frame holding a lens and movable along an optical axis, the lens holding frame having a sleeve portion, the sleeve portion having a front end and a rear end, and a guide bar configured to guide the sleeve portion of the lens holding frame along the optical axis. The guide bar extends to a location nearer to an image plane than the coupling surface of the mount member. The rear end of the sleeve portion is disposed nearer to the image plane than the lens.

7 Claims, 7 Drawing Sheets

LENS BARREL AND PHOTOGRAPHING APPARATUS INCORPORATING THE SAME

BACKGROUND OF THE INVENTION

1. Field of the Invention

The present invention relates to a lens barrel and a photographing apparatus incorporating the lens barrel. For example, the present invention relates to a lens barrel configured to drive an optical element, such as a focusing lens or a zoom lens, with a linear actuator along an optical axis, and to a photographing apparatus incorporating such a lens barrel. In particular, the present invention relates to an interchangeable lens barrel having an imaging optical system configured to bayonet-couple to a camera body having an image capture unit via a coupling mount, and to a photographing apparatus incorporating the interchangeable lens barrel.

2. Description of the Related Art

Heretofore, a variety of zoom lenses for video cameras or lenses for digital still cameras have been developed. Among them, a typical zoom lens for video cameras includes four lens units, i.e., in order from the object side, a fixed front lens unit, a variator lens unit movable along an optical axis for varying magnification, a fixed afocal lens unit, and a focusing lens unit movable along the optical axis for focusing and for maintaining a focal plane at a given location during the variation of magnification. Japanese Laid-Open Patent Application No. 2002-214504 discloses a driving device having a linear motor adapted to drive the focusing lens unit of such a zoom lens.

FIGS. 6A to 6D illustrate the structure of a driving device for driving a focusing lens unit with a linear motor as disclosed in the above Japanese Laid-Open Patent Application No. 2002-214504. FIG. 6A is a longitudinal sectional view showing the structure of a lens barrel containing a typical four-unit zoom lens. FIG. 6B is a sectional view taken along line 6B—6B of FIG. 6A.

In the lens barrel shown in FIGS. 6A and 6B, the zoom lens includes a front lens unit 501a, a variator lens unit 501b, an afocal lens unit 501c, and a focusing lens unit 501d. Guide bars 503, 504a, and 504b are disposed in parallel to an optical axis 505 to guide movable lens units, i.e., the variator lens unit 501b and the focusing lens unit 501d, and to prevent rotation thereof. A DC motor 506 serves as a drive source for moving the variator lens unit 501b. A front-lens tube 502 holds the front lens unit 501a. A variator (V) moving ring 511 holds the variator lens unit 501b. An intermediate frame 515 holds the afocal lens unit 501c. A rear-relay (RR) moving ring 514 holds the focusing lens unit 501d.

The front-lens tube 502 is fixed in position to a rear tube 516. The guide bar 503 is positioned and supported by the front-lens tube 502 and the rear tube 516. A guide screw shaft 508 is also supported for rotation by the front-lens tube 502 and the rear tube 516. The guide screw shaft 508 is configured to be rotated by the rotation of an output shaft 506a of the DC motor 506 being transmitted via a gear train 507.

The V moving ring 511, which holds the variator lens unit 501b, includes a pressure spring 509 and a ball 510. The pressure spring 509 generates a spring force to cause the ball 510 to engage with a screw groove 508a formed on the guide screw shaft 508. When the guide screw shaft 508 is rotated by the DC motor 506, the V moving ring 511 moves forward or backward along the optical axis 505 while being guided and prevented from rotating by the guide bar 503.

The guide bars 504a and 504b are fitted and supported between the rear tube 516 and the intermediate frame 515. The intermediate frame 515 is fixed in position to the rear tube 516. The RR moving ring 514 is movable forward or backward along the optical axis 505 while being guided and prevented from rotating by the guide bars 504a and 504b.

The RR moving ring 514, which holds the focusing lens unit 501d, has sleeve portions in which the guide bars 504a and 504b are slidably fitted. A rack 513 is mounted on the RR moving ring 514 such that the rack 513 is movable along the optical axis 505 integrally with the RR moving ring 514. A stepping motor 512 has a lead screw shaft 512a formed integrally with an output shaft thereof. When the stepping motor 512 is driven, the lead screw shaft 512a rotates. The rack 513, which is mounted on the RR moving ring 514, engages with the lead screw shaft 512a. When the lead screw shaft 512a rotates, the RR moving ring 514 moves along the optical axis 505 while being guided by the guide bars 504a and 504b.

Similar to the drive source for the focusing lens unit 501d, a stepping motor may be used as a drive source for the variator lens unit 501b.

The front-lens tube 502, the intermediate frame 515, and the rear tube 516 constitute a lens barrel body which contains the lens units 501a to 501d, etc., in an approximately hermetically-sealed manner.

Incidentally, in cases where a lens-unit holding frame is moved with such a stepping motor, a photointerrupter or the like is used to detect that the lens-unit holding frame is located in a reference position with respect to the optical axis direction. Then, the absolute position of the lens-unit holding frame is detected by continuously counting the number of driving pulses applied to the stepping motor.

A diaphragm unit 535 is configured to adjust the amount of incident light by driving a diaphragm mechanism disposed between the V moving ring 511 and the intermediate frame 515.

In the configuration shown in FIGS. 6A and 6B, the DC motor or the stepping motor is used to move the lens unit 501b or 501d. However, a linear actuator, such as a linear motor or a VCM (voice coil motor), can also be used for that purpose. FIG. 6C is a front elevation view as viewed from the optical axis direction of a portion around the focusing lens unit 501d shown in FIGS. 6A and 6B in an example in which a linear motor is used as a drive source for the focusing lens unit 501d. FIG. 6D is a perspective view of the linear motor shown in FIG. 6C.

In general, there are two types of the linear motor, a moving coil type and a moving magnet type. In the moving coil type, a coil is disposed on the movable side. In the moving magnet type, a magnet is disposed on the movable side. In the example shown in FIGS. 6C and 6D, the moving coil type is used.

Referring to FIGS. 6C and 6D, a coil 601 is integrally fixed via adhesive bonding or the like to the RR moving ring 514 holding the focusing lens unit 501d on the movable side. A driving magnet 602 and a yoke 603 are fixed to a lens barrel body (not shown, but for example, the rear tube 516) on the stationary side.

The coil 601, the magnet 602, and the yoke 603 constitute a linear motor. When current flows through the coil 601, the linear motor generates a driving force to drive the RR moving ring 514 along the optical axis 505, thus enabling driving the focusing lens unit 501d.

Meanwhile, in the case of an interchangeable lens barrel, a rearmost focusing lens unit tends to have an increased size and an increased weight. In particular, in the case of a 3-CCD (charge-coupled device) camera system using a 3P (color separation) prism, a long flange back distance and a long back focal distance are required. Accordingly, the above tendency increases.

In addition, an interchangeable lens barrel has a mount at its rear end for coupling with a camera body. A focusing lens unit disposed at the rear most portion of the lens barrel can be located up to an internal space of the mount so as to perform focusing on an infinitely distant object. In the case of the interchangeable lens barrel, the mount has a configuration convex towards the rear (towards the image plane side).

In such a lens barrel, for example, in the lens barrel disclosed in the above-described Japanese Laid-Open Patent Application No. 2002-214504 in which a focusing lens unit is driven by a driving device having a linear motor, a sleeve portion in which a guide bar for the focusing lens unit is fitted is located in a position nearer to the front (the object side) than the center of gravity of the focusing lens unit as viewed in the optical axis direction. Thus, the center of gravity of the focusing lens unit is located outside a space between a front end and a rear end of the sleeve portion. Accordingly, in some cases, due to the unbalance of the focusing lens unit with respect to the center of gravity, the driving device cannot provide satisfactory operation characteristics.

Furthermore, in the case of an interchangeable lens barrel, the rearmost focusing lens unit tends to have an increased size and an increased weight as described above. Accordingly, an actuator for driving the focusing lens unit is required to have a large output, thus resulting in an increase in size. Therefore, in cases where a linear actuator, such as the above-described VCM, is used, a large-sized magnet, yoke, etc., have to be employed.

Furthermore, in the case of an optical system having a high magnification, for example, a 20× magnification, the rearmost focusing lens unit has a large focusing stroke. Accordingly, the plate thickness of a yoke is required to have a large value depending on the large focusing stroke. In this instance, if the plate thickness of the yoke exceeds a given value, it becomes difficult to mass-produce U-shaped yokes. To take measures against this difficulty, it may be possible to widen a U-shaped yoke in a lateral direction thereof and to thin a magnet so that the plate thickness of the yoke can be made small. However, in doing so, an actuator unit composed of the magnet and the yoke increases in size in the lateral direction. As a result, a lens barrel also increases in size.

SUMMARY OF THE INVENTION

The present invention is directed to a lens barrel and a photographing apparatus in which the balance of the center of gravity of a focusing lens unit is improved to obtain good driving characteristics. The present invention is also directed to a lens barrel and a photographing apparatus including a small actuator that does not cause an increase in leakage flux or a decrease in thrust.

In one aspect of the present invention, a lens barrel includes a mount member having a coupling surface for coupling with the camera body, a lens holding frame holding a lens and movable along an optical axis, the lens holding frame having a sleeve portion, the sleeve portion having a front end and a rear end, and a guide bar configured to guide the sleeve portion of the lens holding frame along the optical axis. The guide bar extends to a location nearer to an image plane than the coupling surface of the mount member. The rear end of the sleeve portion is disposed nearer to the image plane than the lens.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a longitudinal sectional view of the conventional lens barrel, in which a four-unit zoom lens is incorporated. FIG. 6B is a sectional view taken along line 6B—6B of FIG. 6A. FIG. 6C is a front view showing the structure of a portion surrounding a focusing lens unit of the zoom lens. FIG. 6D is a perspective view of the linear motor.

DETAILED DESCRIPTION OF THE EMBODIMENTS

Embodiments of the invention will be described in detail below with reference to the drawings.

First Embodiment

Figure 1:
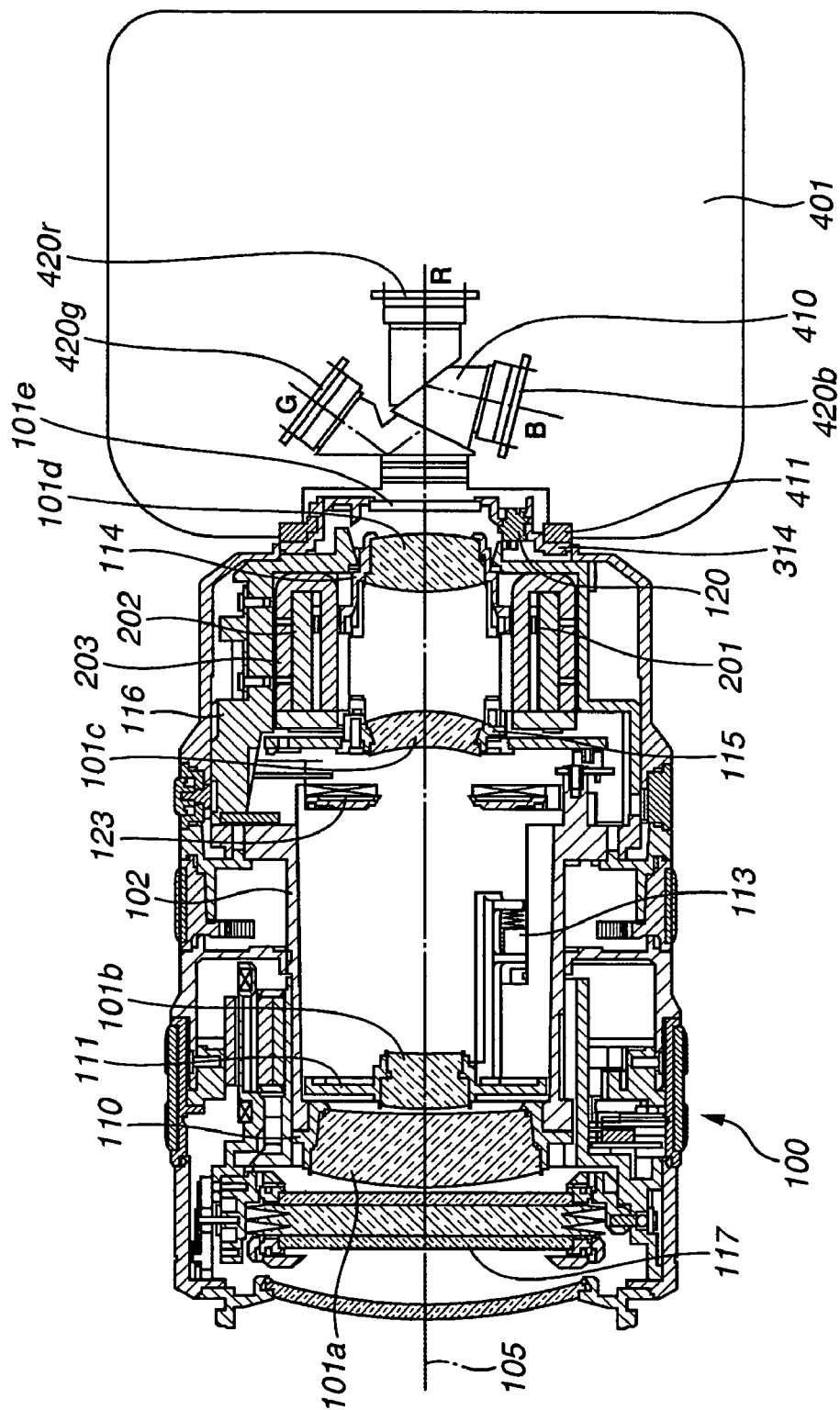
FIG. 1 is a longitudinal sectional view of a lens barrel according to a first embodiment of the invention in a condition where the lens barrel is coupled to a camera body.
Figure 2:
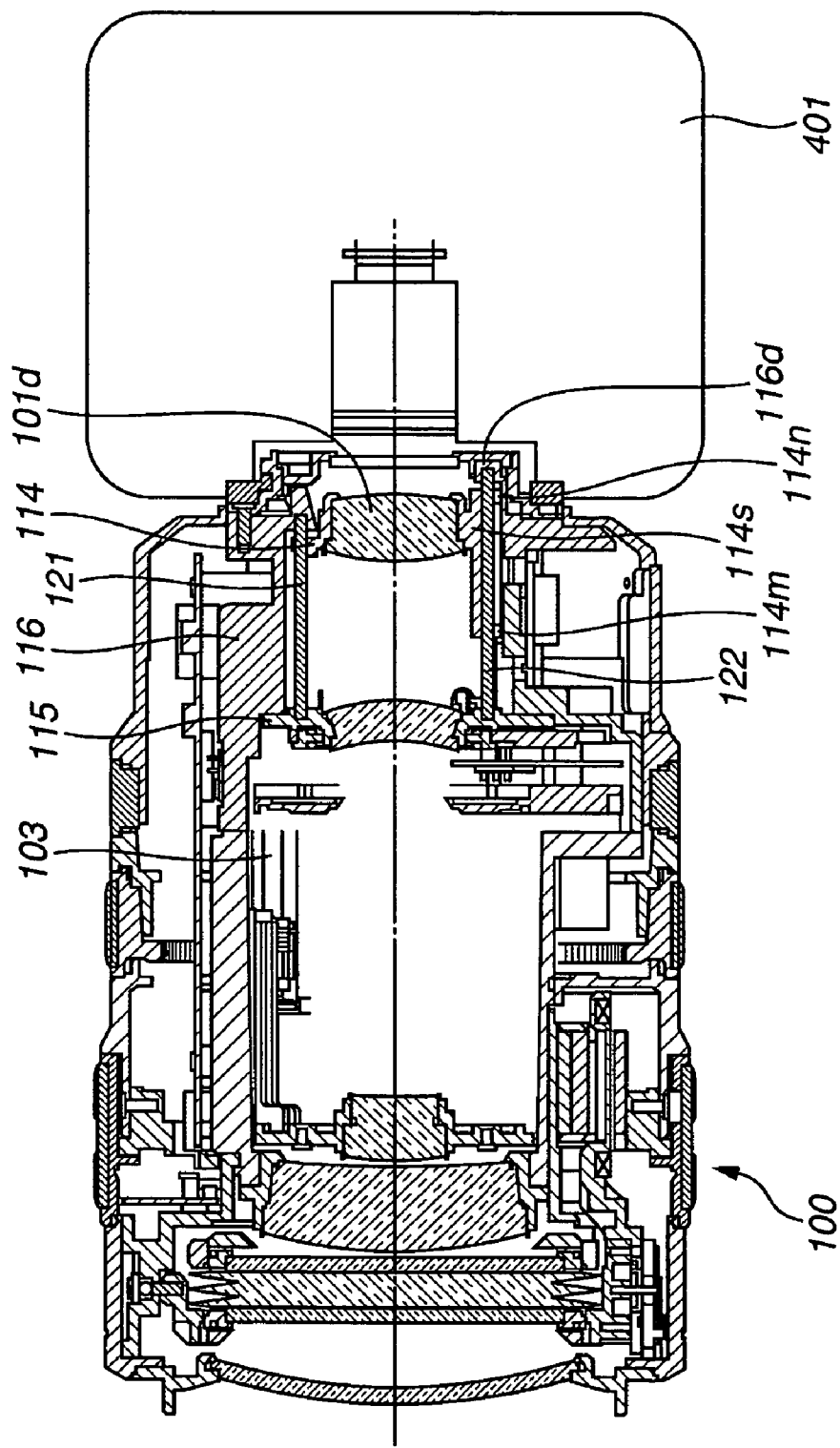
FIG. 2 is a transverse sectional view of the lens barrel according to the first embodiment in a condition where the lens barrel is coupled to the camera body.

FIG. 1 is a longitudinal sectional view of an interchangeable lens barrel 100 according to a first embodiment of the invention. In FIG. 1, the lens barrel 100 is coupled to a camera body 401 via a coupling mount. The lens barrel 100 includes a zoom lens as an imaging optical system, and the camera body 400 includes an image capture unit. FIG. 2 is a transverse sectional view of the lens barrel 100.

Referring to FIGS. 1 and 2, the zoom lens includes four lens units, i.e., a fixed positive lens unit 101a, a movable negative lens unit 101b, a fixed positive lens unit 101c, and a movable positive lens unit 101d. More specifically, the fixed positive lens 101a is a fixed front lens unit. The movable negative lens unit 101b is a variator lens unit movable along an optical axis 105 for zooming. The fixed positive lens unit 101c is a fixed afocal lens unit. The movable positive lens 101d is a focusing lens unit movable along the optical axis 105 for adjusting focus and keeping the position of a focal plane during zooming. A protection glass 101e is disposed at a rearmost portion of the zoom lens.

Guide bars 103, 121, and 122 are disposed in parallel to the optical axis 105 to guide the movable lens units 101b and 101d and to prevent the rotation thereof. The variator lens unit 101b is moved by a stepping motor (not shown) having a lead screw via a rack member 113.

The front lens unit 101a is held by a front-lens tube 110 and is positioned by a front tube 102. The variator lens unit 101b is held by a variator (V) moving ring 111. The afocal lens unit 101c is held by an intermediate frame 115. The focusing lens unit 101d is held by a rear-relay (RR) moving ring 114.

The front tube 102 is fixed in position to a rear tube 116. The guide bar 103 is positioned and supported by the front tube 102 and the rear tube 116. The stepping motor (not shown) rotates the lead screw. The lead screw is formed integrally with an output shaft of the stepping motor. The rack 113 is mounted on the V moving ring 111 and engages with the lead screw of the stepping motor. When the lead screw rotates, the V moving ring 111 moves along the optical axis 105 while being guided by the guide bar 103.

The guide bars 121 and 122 are fitted between and supported by the rear tube 116 and the intermediate frame 115. The intermediate frame 115 is fixed in position to the rear tube 116. The RR moving ring 114 is movable forward or backward along the optical axis 105 while being guided and prevented from rotating by the guide bars 121 and 122.

The RR moving ring 114 serves a focusing lens holding frame for holding the focusing lens unit 101d. The RR moving ring 114 has a sleeve portion 114s in which the guide bar 122 is slidably fitted as shown in FIG. 2. The sleeve portion 114s includes a front end 114m (an end portion on the object side) and a rear end 114n (an end portion on the image plane side).

The front-lens tube 110, the front tube 102, the intermediate frame 115, and the rear tube 116 constitute a body of the lens barrel 100 containing the lens units 101a to 101d, etc., in an almost hermetically-sealed manner.

A diaphragm unit 123 adjusts the quantity of incident light by driving a diaphragm mechanism disposed between the V moving ring 111 and the intermediate frame 115.

In the first embodiment, the RR driving ring 114 holding the focusing lens unit 101d is driven by a linear actuator. The linear actuator is of the moving coil type, in which a coil is disposed on the movable side. Thus, two coils 201 are integrally fixed via adhesives to the RR moving ring 114 holding the focusing lens unit 101d, which is the movable side. On the stationary side, driving magnets 202 and yokes 203 are fixed to the rear tube 116 serving as the body of the lens barrel 100. The coils 201, the driving magnets 202, and the yokes 203 constitute a linear motor. When current flows through the coils 201, the linear motor generates thrust to drive the RR moving ring 114 along the optical axis 105.

In addition, in the first embodiment, an image stabilizing device using a variable angle prism (VAP) 117, such as that disclosed in Japanese Laid-Open Patent Application No. 05-107583, is disposed in front of the imaging optical system. In this variable angle prism 117, an electromagnet unit is oriented to the rear in the optical axis direction. Furthermore, in the first embodiment, a control system for an image stabilizing device disclosed, for example, in Japanese Laid-Open Patent Application No. 11-133474 is used for the variable angle prism 117.

Figure 3:
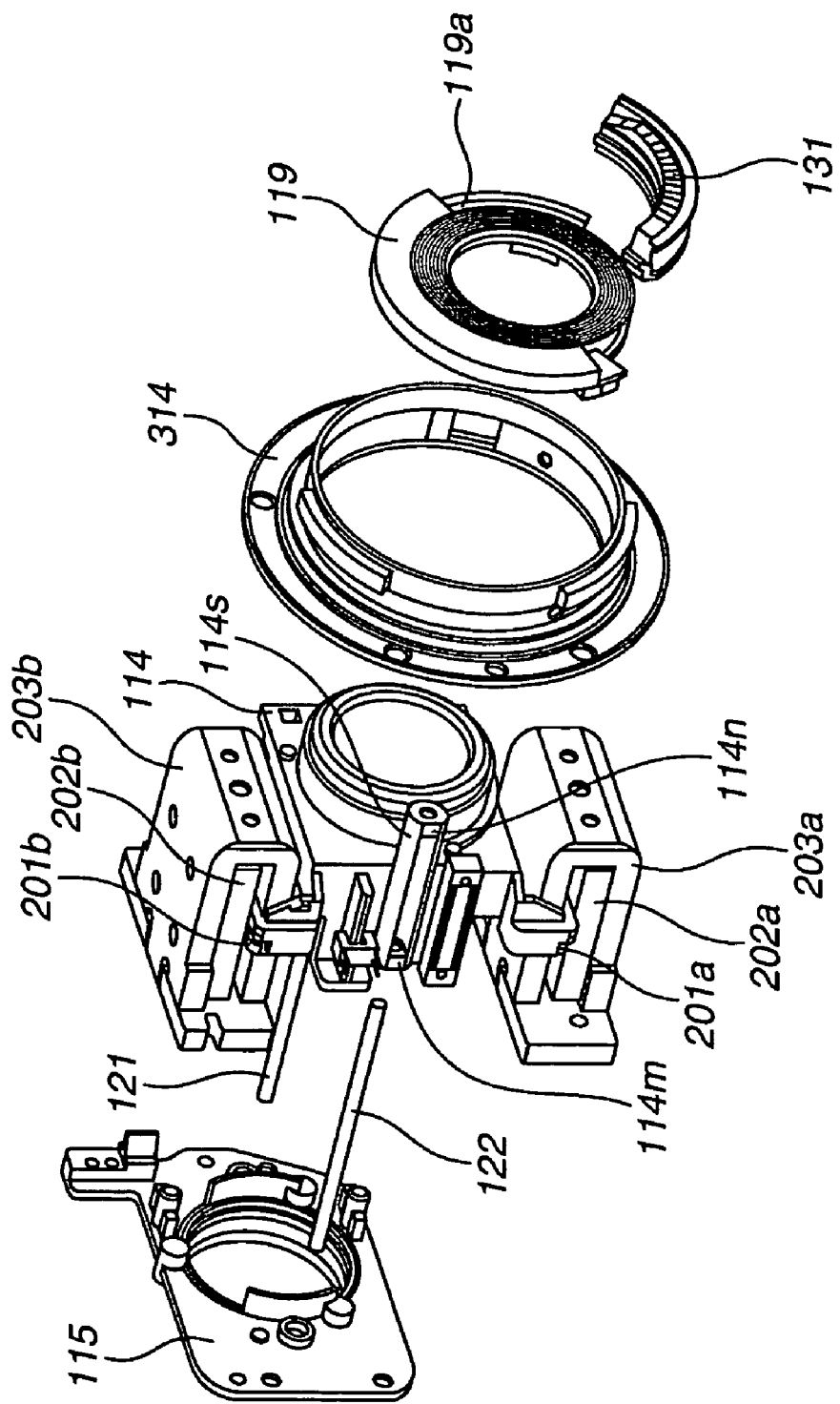
FIG. 3 is an exploded perspective view of a rear part of the lens barrel according to the first embodiment as viewed from a lens mount.

The lens barrel 100 has a lens mount 314. As shown in FIGS. 1 and 3, on the lens mount 314, a back cover 119 and a contact block 120 are disposed. The back cover 119 has the rear protection glass 101e mounted thereon. The contact block 120 is used to exchange electrical signals with the camera body 401. The camera body 401 has a camera mount 411. The lens mount 314 is configured to be coupled to the camera mount 411 via bayonet fittings at a predetermined coupling surface. In the camera body 401, an object image is formed on an image sensor, such as a CCD (charge-coupled device) sensor, via a 3P (color separation) prism 410. In the first embodiment, a 3-CCD system having three CCD sensors 420b, 420g, and 420r is employed.

FIG. 3 is an exploded perspective view of a rear part of the lens barrel 100 as viewed from the lens mount 314 (as viewed from the image plane side). Referring to FIGS. 2 and 3, the rear end of the guide bar 122 is held by a rear end portion 116d of the rear tube 116 in a position inside an internal space of a cylindrical portion formed by the lens mount 314 and the back cover 119. In other words, the guide bar 122 is configured to extend to a location nearer to the image plane than a coupling surface between the lens barrel 100 and the camera body 401.

Figure 4:
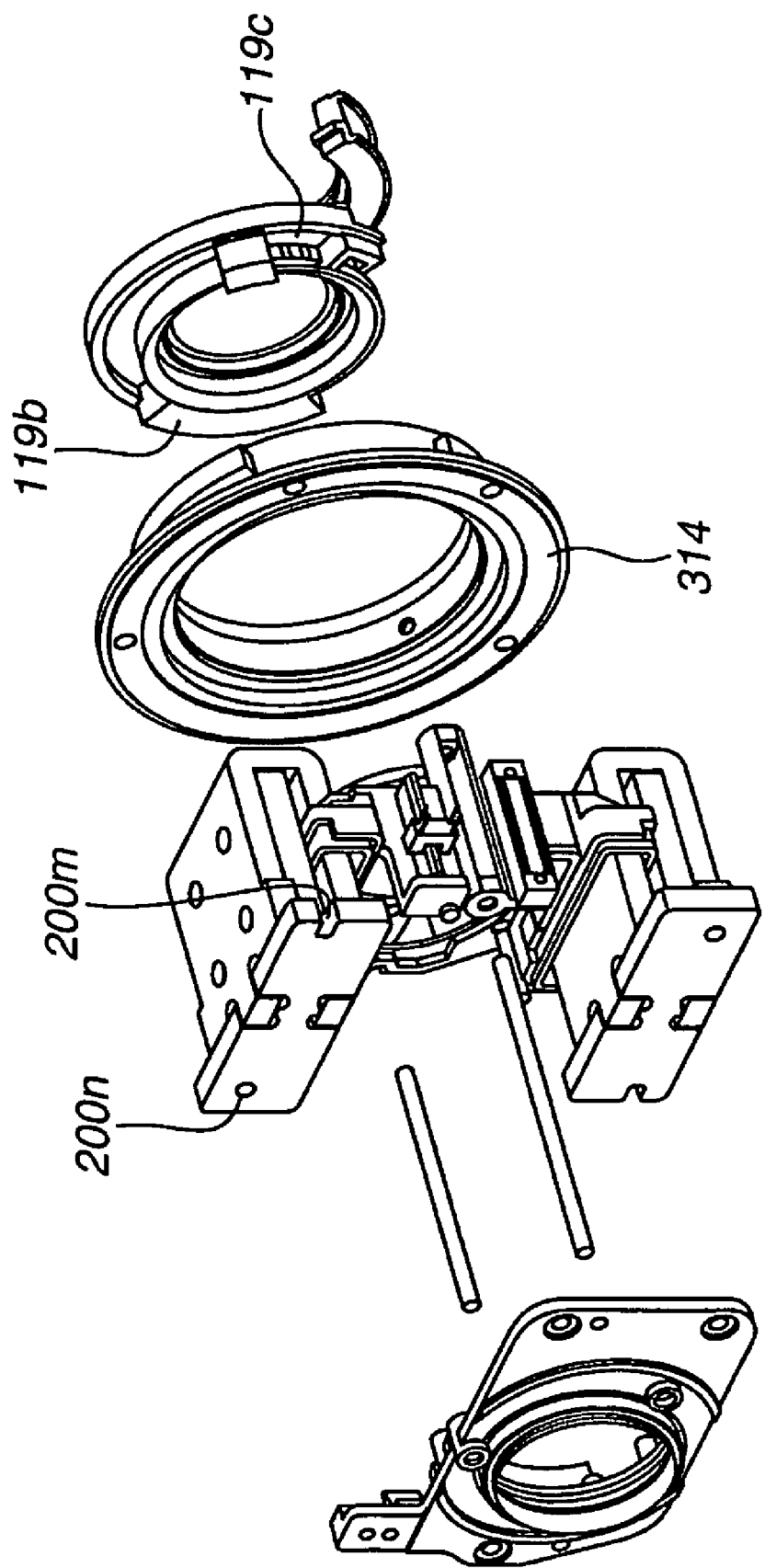
FIG. 4 is an exploded perspective view of the rear part of the lens barrel according to the first embodiment as viewed from the front.

On the side of the guide bar 122, the back cover 119 has an internal space allowing a part of the guide bar 122 to be disposed therein. On the side of the other guide bar 121, the back cover 119 does not have an internal space allowing a part of the guide bar 121 to be disposed therein. The reason for this is as follows. In the first embodiment, when the lens barrel 100 is mounted on the camera body 401, the lens barrel 100 is rotated clockwise as viewed from the front (the object side). During this mounting, the lens barrel 100 should not interfere with an electrical contact portion of the camera body 401. Therefore, it is necessary that a recess portion 119a be provided at the back cover 119 on the side of the guide bar 121. Referring to FIG. 4, which is an exploded perspective view of the rear part of the lens barrel 100 as viewed from the front, the recess portion 119a appears as a projecting portion 119b. In addition, a recess portion 119c of the back cover 119 serves as a clearance portion in which a part of the guide bar 122 inserted in the rear end portion 116d of the rear tube 116 is located.

With such configuration, the guide bar 122 is used to guide the sleeve portion 114s up to the internal space of the cylindrical portion formed by the lens mount 314 and the back cover 119. In addition, the rear end 114n of the sleeve portion 114s is located in a position nearer to the rear (the image plane side) than the focusing lens unit 101d. In addition, the center of gravity of the focusing lens unit 101d is located between the front end 114m and the rear end 114n of the sleeve portion 114s as viewed along the optical axis 105.

Furthermore, in the above-described conventional lens barrel, the rear ends of the guide bars 504a and 504b are held by portions nearer to the object side than the lens mount, i.e., a coupling surface between the lens barrel and the camera body. Accordingly, the center of gravity of the RR moving ring 514 is located nearer to the rear than the rear end of the sleeve portion as viewed along the optical axis. In addition, in a case where the rear ends of the guide bars 504a and 504b are held at portions outside the lens mount distant from the optical axis, the distance of the sleeve portion from the optical axis is large as compared to the length of the sleeve portion in the optical axis direction. In such a conventional structure, the RR moving ring 514 tends to be unbalanced with respect to the center of gravity thereof, so that the driving characteristics of the RR moving ring 514 may be deteriorated.

According to the first embodiment, as described above, the center of gravity of the RR moving ring 114 is located between the front end 114m and the rear end 114n of the sleeve portion 114s as viewed along the optical axis 105.

Accordingly, the RR moving ring 114 is well-balanced with respect to the center of gravity thereof, so that the driving characteristics of the RR moving ring 114, i.e., a holding frame for the focusing lens unit 101d, can be improved.

Second Embodiment

Figure 5:
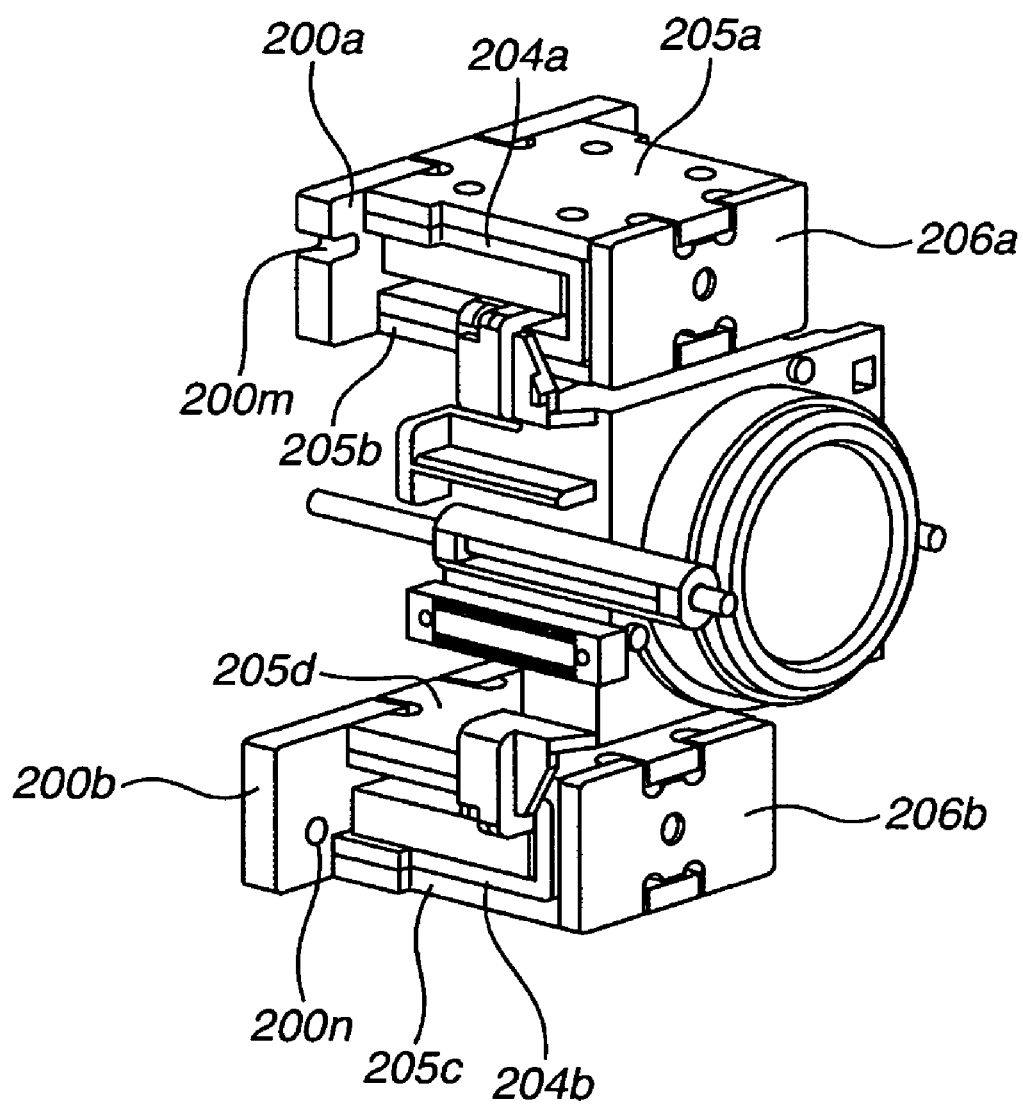
FIG. 5 is a perspective view of a linear actuator according to a second embodiment of the invention.
Figure 6A:
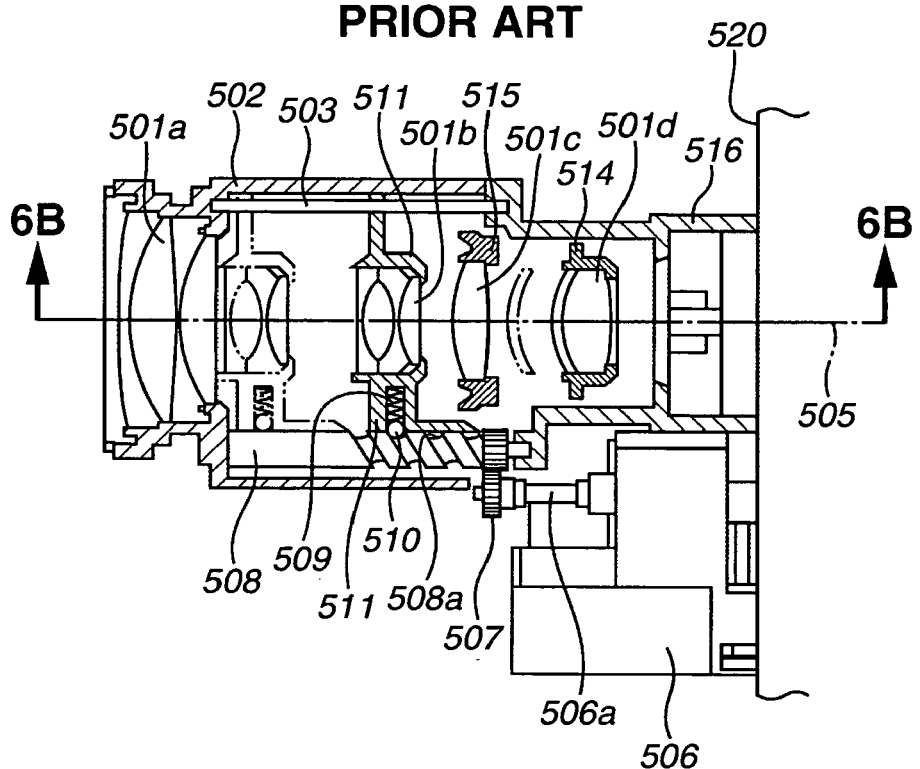
FIGS. 6A to 6D are diagrams illustrating the structure of a conventional lens barrel having a linear motor as a driving portion.
Figure 6B:
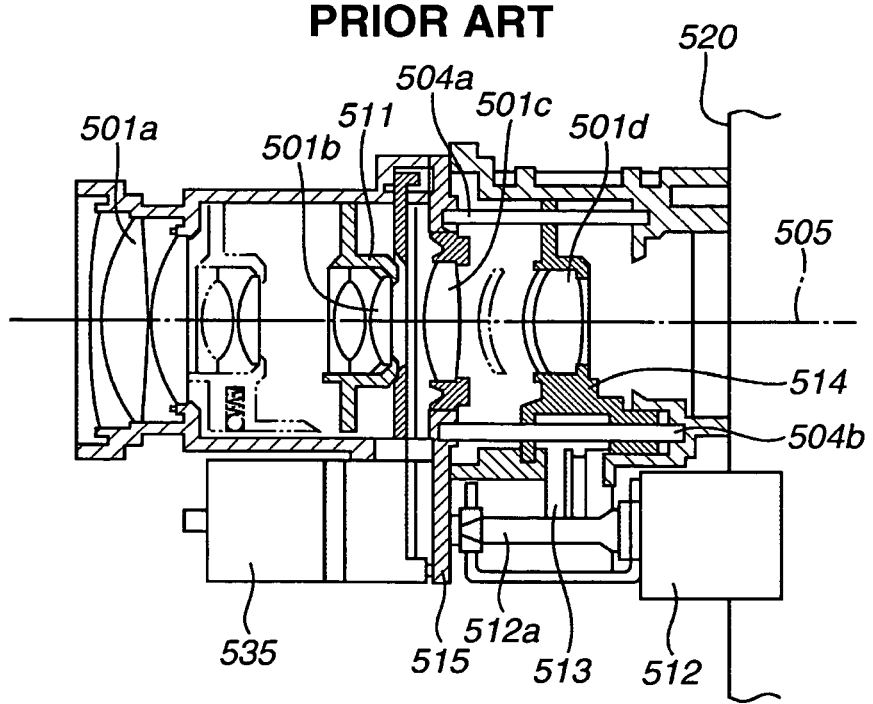
Figure 6C:
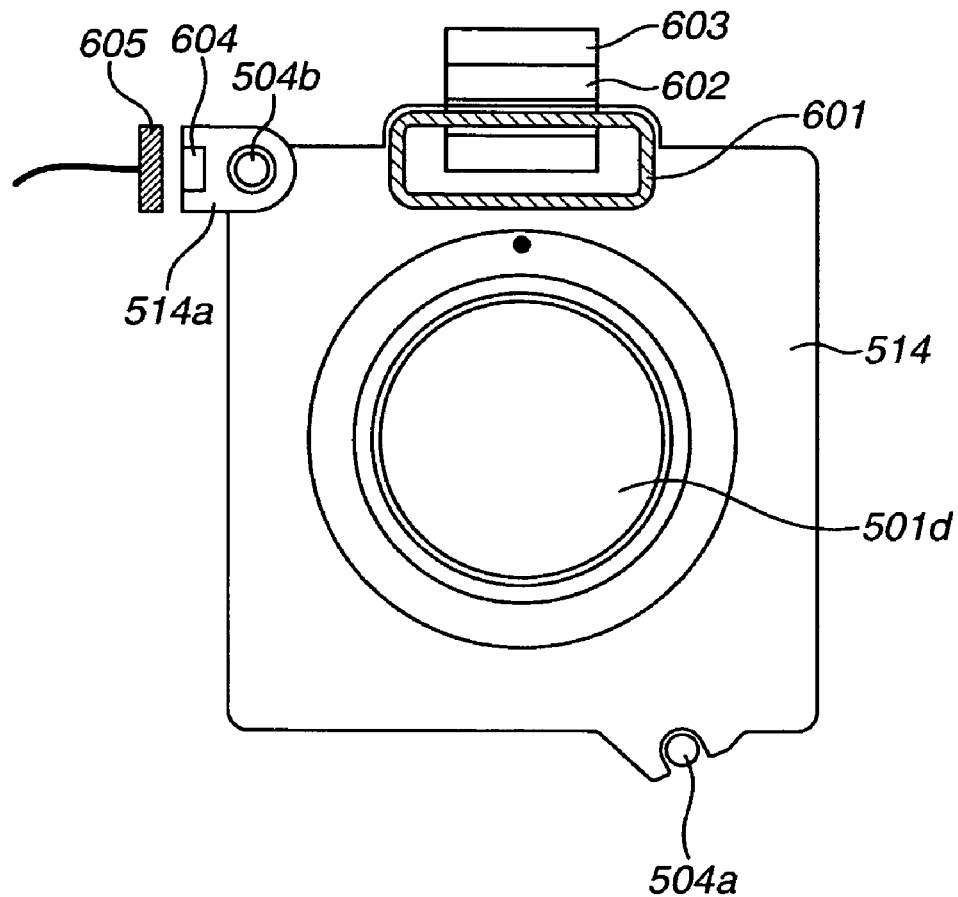
Figure 6D:
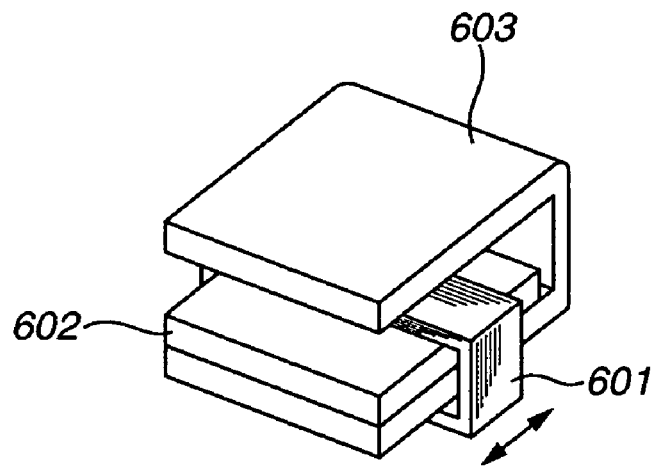

A second embodiment of the present invention relates to an example of the structure of a linear actuator that is applicable to the lens barrel of the first embodiment. FIG. 5 is a perspective view of the linear actuator according to the second embodiment.

With regard to a U-shaped yoke, for example, if the RR moving ring 114 is about 15 g in weight and two linear actuators require generating a force of about 80 gf (gram-force), the plate thickness of a neodymium magnet becomes about 3 mm and the plate thickness of the U-shaped yoke also becomes about 3 mm. In this instance, two legs of the U-shaped yoke are required to have an interval of about 5 mm so as to secure a space for the magnet and an actuation portion of the coil. It is difficult in terms of shape to produce such a U-shaped yoke from one sheet metal.

The second embodiment is directed to solving this difficulty in the plate thickness by using an auxiliary yoke.

Referring to FIG. 5, a first U-shaped yoke 204a and a second U-shaped yoke 204b are produced with a plate thickness available for manufacturing. An auxiliary yoke 205a is disposed on the outer side of an upper portion of the first U-shaped yoke 204a. An auxiliary yoke 205b is disposed on the outer side of a lower portion of the first U-shaped yoke 204a. In addition, an auxiliary yoke 205d is disposed on the outer side of an upper portion of the second U-shaped yoke 204b. An auxiliary yoke 205c is disposed on the outer side of a lower portion of the second U-shaped yoke 204b.

An auxiliary yoke 206a is disposed on the outer side of a bottom portion of the first U-shaped yoke 204a. The auxiliary yoke 206a has cutout recess portions into which projection portions of the auxiliary yokes 205a and 205b are fitted. In addition, an auxiliary yoke 206b is disposed on the outer side of a bottom portion of the second U-shaped yoke 204b. The auxiliary yoke 206b has cutout recess portions into which projection portions of the auxiliary yokes 205c and 205d are fitted.

In the second embodiment, on and beneath the U-shaped yokes 204a and 204b having a plate thickness available for manufacturing, the auxiliary yokes 205a, 205b, 205c, and 205d having the same shape are disposed. The projection portions of the auxiliary yokes 205a, 205b, 205c, and 205d are fitted into the cutout recess portions of the auxiliary yokes 206a and 206b, which are disposed on the bottom portions of the U-shaped yokes 204a and 204b. Accordingly, the outer sides of the U-shaped yokes 204a and 204b can be reinforced with a required plate thickness.

In addition, front yokes 200a and 200b are mounted on the U-shaped yokes 204a and 204b, respectively. The front yokes 200a and 200b are fixed to the rear tube 116 with screws at two points 200m and 200n after the RR moving ring 114 is incorporated and fitted into the actuator unit.

According to the above-described embodiments, a lens barrel and a photographing apparatus having good driving characteristics and including a small actuator that does not cause an increase in leakage flux or a decrease in thrust can be provided.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-187048 filed Jun. 24, 2004, which is hereby incorporated by reference herein.

What is claimed is:

1. A lens barrel comprising:
   a mount member including a coupling surface configured to couple with a camera body;
   a lens holding frame holding a lens and movable along an optical axis, the lens holding frame including a sleeve portion, the sleeve portion having a front end and a rear end; and
   a guide bar configured to guide the sleeve portion of the lens holding frame along the optical axis,
   wherein the guide bar extends to a location nearer to an image plane than the coupling surface of the mount member,
   wherein the rear end of the sleeve portion is disposed nearer to the image plane than the lens, and
   wherein a center of gravity of the lens is located between the front end and the rear end of the sleeve portion along the optical axis.

2. A photographing apparatus comprising:
   the lens barrel according to claim 1, and
   a camera body coupled to the lens barrel.

3. A lens barrel comprising:
   a mount member including a coupling surface configured to couple with a camera body,
   a lens holding frame holding a lens and movable along an optical axis, the lens holding frame including a sleeve portion, the sleeve portion having a front end and a rear end; and
   a guide bar configured to guide the sleeve portion of the lens holding frame along the optical axis,
   wherein the guide bar extends to a location nearer to an image plane than the coupling surface of the mount member,
   wherein the rear end of the sleeve portion is disposed nearer to the image plane than the lens,
   wherein the mount member includes a cylindrical portion disposed nearer to the image plane than the coupling surface, the cylindrical portion having an internal space, and
   wherein the guide bar extends to the internal space of the cylindrical portion and guides the sleeve portion up to the internal space of the cylindrical portion.

4. A photographing apparatus comprising:
   the lens barrel according to claim 3; and
   a camera body coupled to the lens barrel.

5. A lens barrel comprising:
   a mount member including a coupling surface configured to couple with a camera body;
   a lens holding frame holding a lens and movable along en optical axis, the lens holding frame including a sleeve portion, the sleeve portion having a front end and a rear end;
   a guide bar configured to guide the sleeve portion of the lens holding frame along the optical axis;
   a lens barrel body; and
   a linear actuator configured to drive the lens holding frame relative to the lens barrel body, the linear actuator including a yoke, a magnet, and a coil, the yoke and the magnet being fixed to the lens barrel body, the coil being fixed to the lens holding frame, wherein the guide bar extends to a location nearer to an image plane than the coupling surface of the mount member, wherein the rear end of the sleeve portion is disposed nearer to the image plane than the lens, wherein die yoke is U-shaped, and wherein the linear actuator includes at least one auxiliary yoke mounted on an outer side of the U-shaped yoke.

6. A lens barrel according to claim 5, wherein the linear actuator includes three auxiliary yokes mounted on three outer sides of the U-shaped yoke.

7. A photographing apparatus comprising:
the ions barrel according to claim 5; and
a camera body coupled to the lens barrel.

* * * * *